United States Patent [19]

Grabovac et al.

[11] Patent Number: 4,977,775
[45] Date of Patent: Dec. 18, 1990

[54] TORQUE TRANSDUCER

[75] Inventors: Bosko Grabovac, Arcadia; Zlatko Kurtovic, Walnut, both of Calif.

[73] Assignee: Consolidated Devices Inc., City of Industry, Calif.

[21] Appl. No.: 456,725

[22] Filed: Dec. 26, 1989

[51] Int. Cl.⁵ ............................................. G01L 25/00
[52] U.S. Cl. ................................. 73/1.00 C; 73/862.08
[58] Field of Search ................. 73/1 C, 862.08, 862.35

[56] References Cited

U.S. PATENT DOCUMENTS

| | | | |
|---|---|---|---|
| 3,153,930 | 10/1964 | Jackson | 73/862.08 |
| 3,217,533 | 11/1965 | Able | 73/862.08 |
| 4,186,596 | 2/1980 | Bohringer et al. | 73/862.35 |
| 4,562,722 | 1/1986 | Schuele et al. | 73/1 C X |
| 4,643,030 | 2/1987 | Becker et al. | 73/862.23 |

FOREIGN PATENT DOCUMENTS

| | | | |
|---|---|---|---|
| 0102534 | 6/1985 | Japan | 73/862.35 |
| 0173432 | 9/1985 | Japan | 73/862.08 |

OTHER PUBLICATIONS

"Transducer Design": Torque Sensors (Publisher and date unknown).

*Primary Examiner*—Charles A. Ruehl
*Attorney, Agent, or Firm*—Georges A. Maxwell

[57] ABSTRACT

The Torque Transducer structure comprising a lower base plate, and an elongate torque member projecting vertically upwardly from the plate. The member has rigid upper and lower end portions and a central deflection portion that is rigid through a first radial plane through the structure and is flexible through a second radial plane of the structure which is at right angle to the first radial plane. The central portion of the member carries strain gauges and is torsionally deflected by torsional forces directed onto the upper end portion of the member. The member is subject to adverse lateral deflection through the second radial plane of the structure by lateral forces directed onto its upper end portion. The lower end portion of the member is coupled with the plate against rotation and for free pivotal movement relative thereto through said second radial plane of the structure. The structure includes a stop structure that is in fixed position relative to the plate and that engages the upper end portion of the member, stops lateral displacement thereof and directs lateral forces directed through and from the upper end portion of the member to the plate so that the central portion of the member is not subjected thereto and deflected thereby.

5 Claims, 2 Drawing Sheets

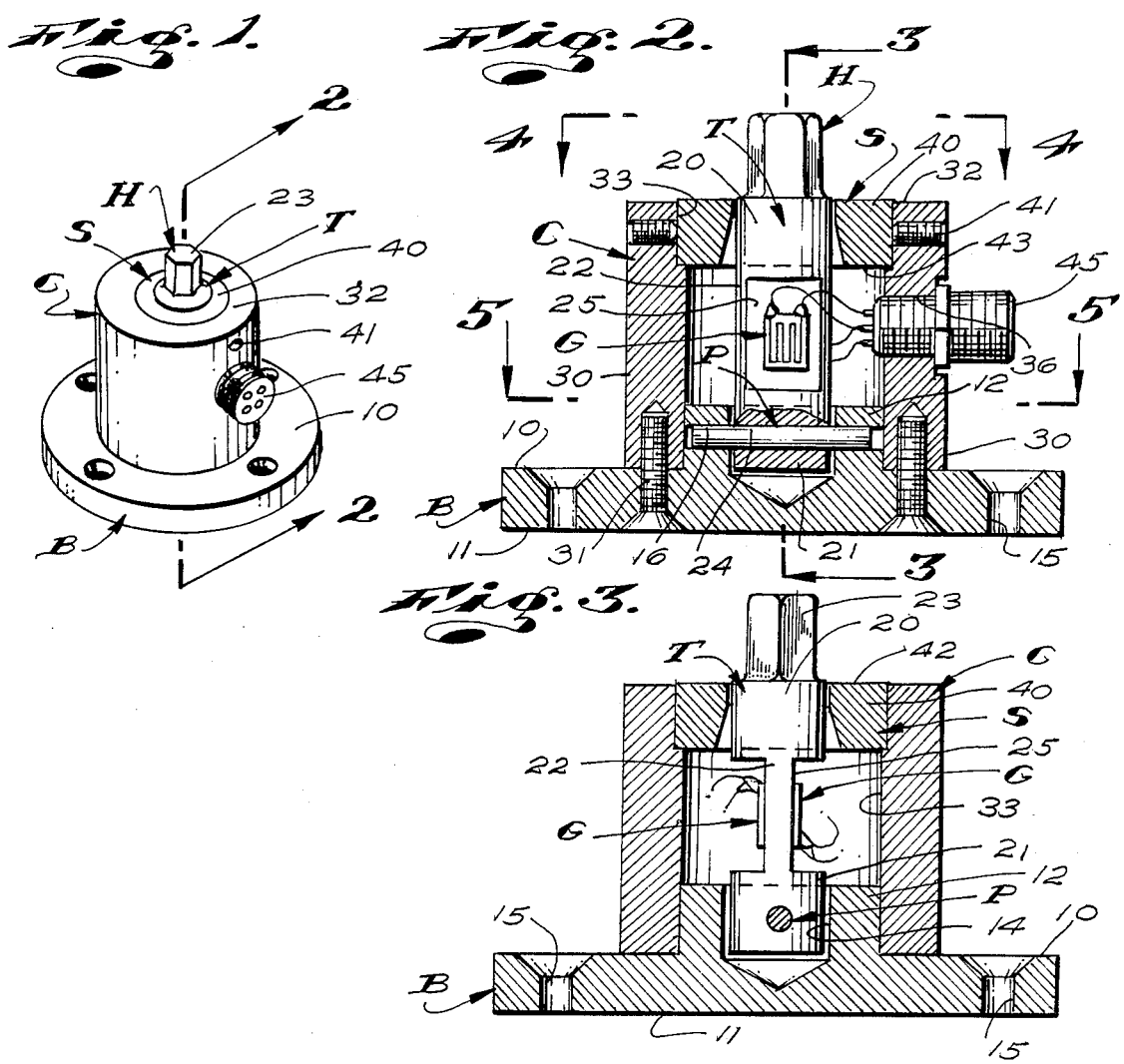
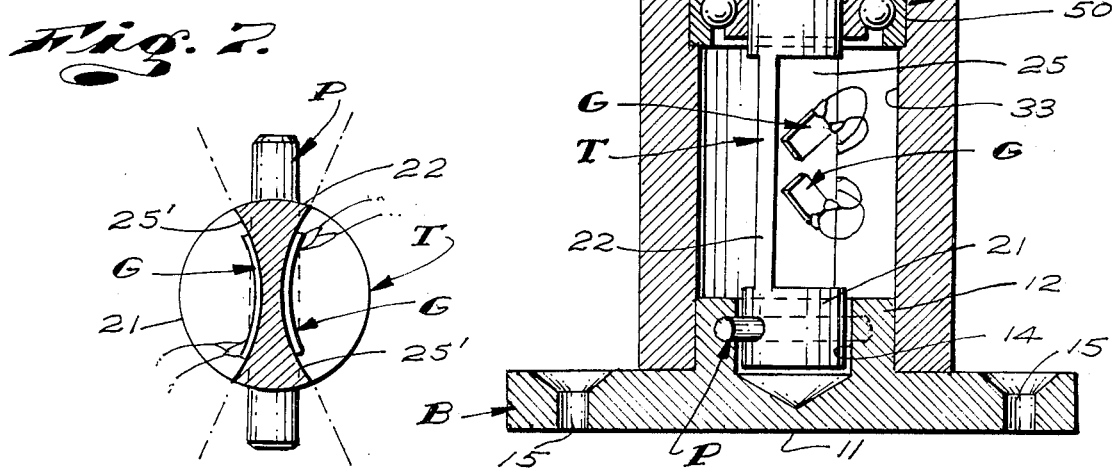

TORQUE TRANSDUCER

BACKGROUND OF THE INVENTION

Throughout the mechanical arts, there is an ever increasing want, need and use of devices that sense and/or read torsional forces applied or directed onto and through elements and parts of mechanisms and that are used to control, record or otherwise manage the application and/or use of such forces.

One widely used form of torque sensing device consists of an elongate torsion member in the form of a rod or bar established of a metal alloy having a predetermined modulous of elasticity and other desired physical properties and/or characteristics. One end of the torsion member is fixed to a mounting plate that can be advantageously secured or anchored in fixed position with said member projecting freely therefrom. One end of the torsion member is fixed to the mounting plate, as by welding, while its other or free end is made to receive those torsional forces to be measured and, most often, is in the form of a polygonal tool engaging head that can be cooperatively engaged by a common wrench socket or the like. The torsion member has one or a plurality of strain gauges fixed to the exterior surface of a central working portion thereof. The strain gauge or gauges are suitably connected with a bridge circuit that is a part of an electric circuit that includes a suitable force indicating read-out device. When torsional forces are directed onto and through the torsion member, the central working portion thereof is torsionally deflected to an extent corresponding to the magnitude of the force applied, the strain gauge or gauges are deflected or biased a corresponding extent and the electrical circuit functions to indicate the magnitude of the applied force, at its read-out device.

The above-noted kind of torque sensing device is that kind of device with which the present invention is concerned and is that kind of device that is commonly referred to and that will here and after be called a Torque Transducer.

The effectiveness, accuracy and dependability of those torque transducers provided by the prior art is often satisfactory in those circumstances where substantial or great torsional forces are to be measured and where the torsion members are made so heavy and stable that they are not subject to be adversely bent or laterally deflected by secondary or random lateral forces that are often directed onto the input ends of the torsion members during ordinary use thereof.

When torque transducers of the character here concerned with are made to receive and measure light or weak torsional forces the central working portions of the torsion members thereof (with which the strain gauges are related) must be made sufficiently small and weak in effective cross-section so that they will torsionally deflect a desired extent when subjected to those light or weak forces sought to be measured.

When the central portions of such devices are made sufficiently weak and small in cross-section to effectively measure light torsional forces, they are often made so weak that they are highly subject to being adversely bent or deflected laterally by small random lateral forces inadvertently applied to the input ends of the members and are thereby rendered undependable and unreliable to give accurate readings.

To overcome the adverse effects of lateral bending or deflection of the working portions of the torque members of torque transducers, the prior art has sought to prevent lateral displacement of the outer or free end portions of the torque members that occur between the central working portions thereof and the heads or work input ends thereof by means of anti-friction bearing means. While use of such bearing means works to prevent great lateral displacement of the bearing-related portions of the torsion members, it has been clearly determined that the necessary working clearances in such bearing means is often or shortly becomes sufficient to allow enough lateral displacement of the torsion members to adversely affect the operation and accuracy of the torque transducers.

In efforts to overcome the above-noted adverse effects of lateral deflection of the torsion members in torque transducers, some in the prior art have lengthened the bearing supported portions of the torsion members and have resorted to the use of two or more axially spaced anti-friction bearings in an effort to afford the members with greater axially stability. While such efforts might notably reduce and in some instances eliminate the adverse effects sought to be overcome, they require the torque transducer to be made notably larger, heavier and far more costly to make.

There are those in the prior art that have sought to reduce the torsional strength of the central working portions of the torsion members of torque transducers without materially reducing the lateral stability or bending strength thereof by making them in the form of cage-like structures, the effective radial or cross-sectional extent and resulting lateral stability of which is not appreciably reduced while sufficient stock is removed therefrom to notably reduce the torsional strength thereof. Such structures are complicated and extremely costly to make and most often fail to afford suitable surfaces to which strain gauges can be easily and effectively fixed.

By far, the most effective, efficient and economical manner in which to reduce and weaken the central working portions of the torsion members of torque transducers is to machine flats at diametrically opposite sides of the central portions of the members so as to present large flat surfaces upon which strain gauges can be easily and conveniently fixed and that result in a central working portion that is substantially rectangular in cross-section. The principal shortcoming of such structures resides in the fact that while they are quite strong and resist lateral bending or deflection through their radial planes that are parallel with the flat surfaces thereof, they are often extremely weak and highly subject to lateral bending and/or deflection through their radial planes that are at right angles or normal to the planes of their flat surfaces.

OBJECTIVES AND FEATURES OF THE INVENTION

It is an object of this invention to provide an improved torque transducer of the general character referred to above that includes an elongate cylindrical torsion member with outer work input and inner mounting end portions and a central longitudinally extending, rectangular in cross-section deflection or working portion the major cross-section or width of which is substantially equal to the major cross-sectional dimension or diametric extent of the member; the mounting end portion of which is pivotally connected with a related mounting plate on an axis that is normal to the central longitudinal axis of the member and normal to the major radial plane of said central working portion of the member; and, a transducer that includes an external case carried by said plate and having stops at the opposite sides of the outer end portion of the member on a minor radial plane that is normal to the major plane of the central portion.

It is an object and feature of the invention to provide a transducer of the general character referred to above wherein the central working portion of the deflection member is torsionally deflected by light torsional forces directed onto the outer input end portion thereof; is substantially nonyielding to lateral forces that are substantially parallel with the major radial plane of the central working portion and wherein said stops limit lateral movement of the input portion of the member when the member is pivoted laterally on that minor radial plane that is normal to the major radial plane by unintended lateral forces applied to the input end portion and so that the central working portion is not deflected by those lateral forces.

It is another object and feature of the invention to provide a torque transducer of the general character referred to above wherein the central working portion of the deflection member defines oppositely and radially outwardly disposed surfaces that are particularly suited to have strain gauges fixed to them.

Yet another object and feature of the invention is to provide a torque transducer of the general character referred to above wherein the inner end portion of the torsion member has a transverse pivot pin opening and an elongate pivot pin is engaged through said opening to; hold the member against rotary and axial movement relative to the plate; and, allow for free pivotal movement of the member about the axis of the pin through the minor radial plane that extends through the member.

Still another object and feature of this invention is to provide a novel torque transducer of the general character referred to above wherein the central working portion of the deflection member cooperates with related parts of a case positioned about the deflection member and carried by the plate to define compartments in which the strain gauges on the member, their related conductor lines and portions of related electrical components or parts carried by the case are freely accommodated and protected.

Finally, it is an object and a feature of the invention to provide a torque transducer of the general character referred to above wherein the radially outwardly oppositely disposed surfaces of the central working portion of the torsion member are radially outwardly curved whereby the circumferential extent of the opposite longitudinally extending edges of the central working portion of the member is materially increased, increasing the web effect of that portion of the member without materially increasing the torsional strength thereof.

The foregoing and other objects and features of the invention will be fully understood from the following detailed description of typical preferred forms and embodiments of the invention throughout which description reference is made to the accompanying drawings.

DESCRIPTION OF THE DRAWINGS

FIG. 1 is an isometric view of a torque transducer embodying the invention;

FIG. 2 is an enlarged detailed sectional view taken as indicated by Line 2—2 on FIG. 1;

FIG. 3 is a sectional view taken substantially as indicated by Line 3—3 on FIG. 2;

FIG. 6 is a cross-sectional view of another embodiment of the invention; and,

FIG. 7 is an enlarged transverse sectional view of a modified form of deflection member.

DETAILED DESCRIPTION OF THE INVENTION

Figure 4:
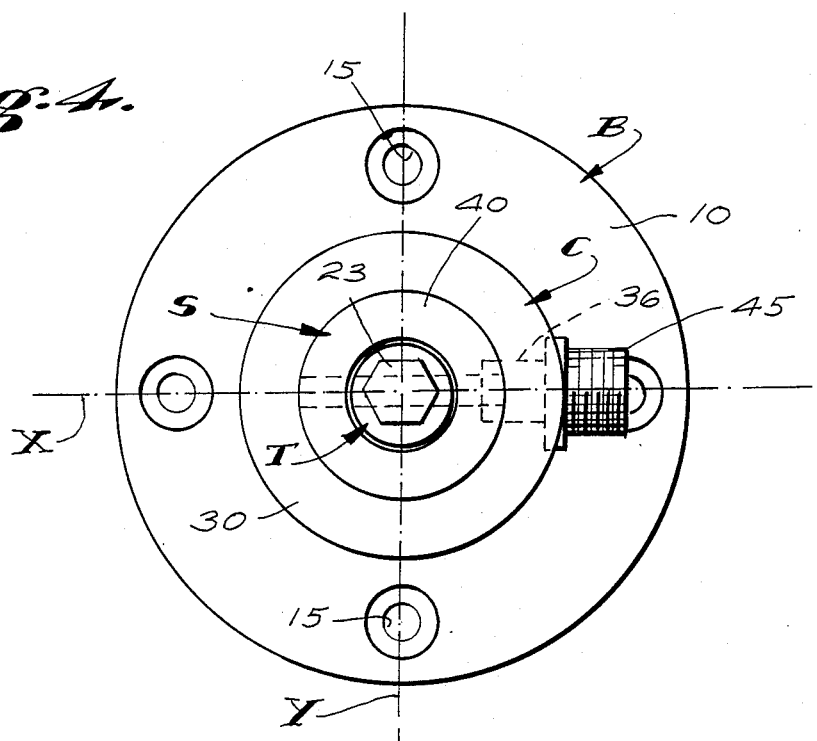
FIG. 4 is a top plan view taken substantially as indicated by Line 4—4 on FIG. 2.
Figure 5:
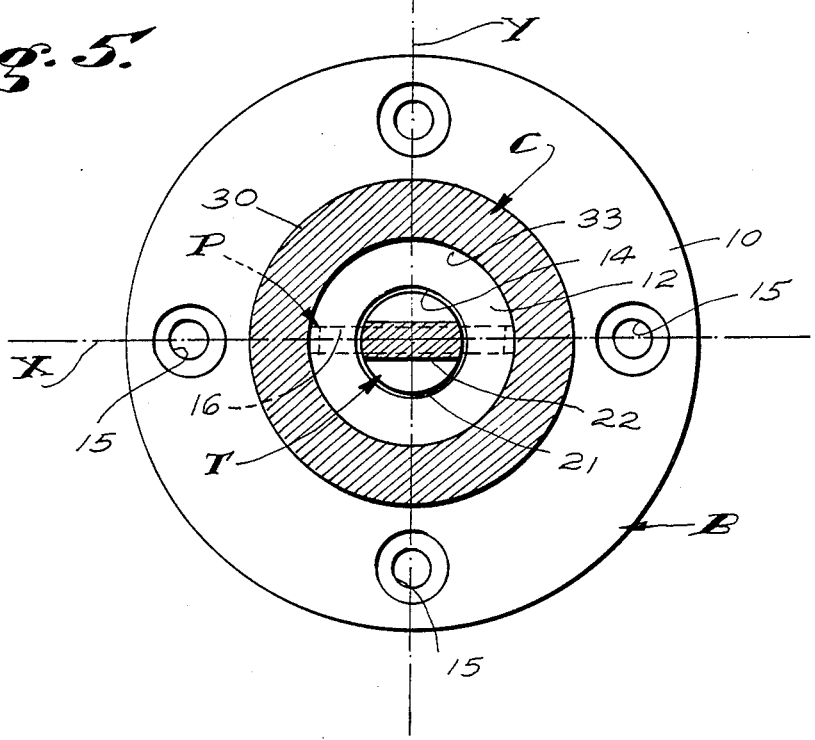
FIG. 5 is a cross-sectional view taken substantially as indicated by Line 5—5 on FIG. 2.

Referring to the drawings, the torque transducer A of the present invention is illustrated and, for the purpose of this disclosure, will be described as being an elongate vertically extending structure with upper and lower ends and as having a vertically extending central longitudinal axis and first and second right angularly related radial planes that extend longitudinally of the device and that extend through and project radially from opposite sides of the central longitudinal axis thereof. The first radial plane occurs on the horizontal phantom lines X and the second radial plane occurs on the vertical phantom lines Y in FIGS. 4 and 5 of the drawings.

The structure A includes a lower base or mounting plate B that supports the other parts of the structure and that facilitates mounting the structure to a related supporting or anchoring structure, such as a work bench (not shown). The plate B is a disc-shaped part with flat, horizontal top and bottom walls 10 and 11 and a central vertical upwardly projecting cylindrical annular boss 12 at the top surface 10 and defining a central upwardly opening cavity 14. The outer peripheral portion of the plate can, as shown, be provided with a plurality of circumferentially spaced fastener receiving openings 15 to facilitate fastening the structure to a related supporting structure.

The boss 12 is formed with a pair of radially extending axially aligned pivot pin openings 16 that extend through opposite side portions thereof. The axes of the openings 16 occur on or extend across the above-noted first radial plane of the device.

The structure A next includes an elongate normally vertically extending torsion member T with a cylindrical lower end portion 21, a cylindrical upper end portion 20, a substantially rectangular in cross-section, longitudinally or vertically extending central deflection or working portion 22 between the upper and lower portions 20 and 21, and torque input means H at projecting upwardly from the upper portion 20. In the preferred carrying out of the invention and as shown, the means H consists of a polygonal tool engaging head 23 concentric with and projecting upwardly from the upper end of the upper portion 20.

The member T is a unitary machined part made of strong, durable and resilient metal alloy that is particularly suited for establishing the torsion members of torque transducers.

The lower end portion 21 of the member T is less in diametric extent than the socket opening 14 in the boss 12 on the plate P and is positioned within the socket opening in free working clearance with the boss and with its lower end above the bottom of the socket. The portion 21 is formed with a pivot pin opening 24 that is in axial alignment with the openings 16 in the boss.

An elongate pivot pin P is engaged through the opening 24 in the member T and has end portions projecting radially from the member T and into and through the opening 16 in the boss 12 of the plate B. The pin P preferably establishes a close sliding fit in the opening 24 and in one of the openings 16 in the boss and establishes a snug, press fit in the other opening 16 in the boss. Thus, the lower end of the member T is pivotally coupled with the plate B and is free to pivot about the axis of the pin P and through the above-noted secondary plane of the structure. That is, the member T pivots and swings through that radial plane of the structure that is at right angle to the first radial plane of the structure on which the pin and/or pivotal axis of the member T occur.

The central deflecting or working portion of the member T is an elongate vertical and axially extending rectangular in cross-section portion established by suitably machining the member T. The portion 22 defines two oppositely disposed substantially flat surfaces 25, the planes of which are parallel with the first radial plane of the structure and that are normal to said second radial plane of the structure. The major cross-sectional dimension or width of the portion 22 is as great as possible and in practice is as great as the diametric extent of the upper and/or lower portions 20 and 21 so that it is imported with maximum web strength to resist lateral bending and/or deflection of the member T through the first radial plane of the structure. The minor cross-sectional dimension or thickness of the portion 22 is made thin and is suitably weakened to make it susceptible to being torsionally deflected (axially twisted) by those torsional forces the structure A is designed to measure. So weakening the portion 22 also renders it highly susceptible to being bent or deflected laterally on or through the second radial plane of the structure when the upper end portion of the member T is subjected to lateral forces directed substantially normal to that plane.

The central lateral plane of the portion 22 occurs midway between the surfaces 25 thereof and is normally coincidental with the first radial plane of the structure.

While torsional deflection of the portion 22 is sought to be attained, lateral bending or deflection of the portion 22, as noted above, is highly undesirable and must be avoided or reduced to a negligible extent if the structure is to function satisfactorily.

The structure A next includes one or more strain gauges G fixed to one or both of the surfaces 25 of the portion 22 of the member T. In the case illustrated, I have shown one gauge G fixed to each of the two surfaces 25. In practice, if desired and if circumstances permit, an array of gauges G might be fixed to each of the surfaces 25, as circumstances might demand.

The number and the positioning of the gauges G is determined by; a longitudinal extent and flexing characteristics of the central deflecting or working portion 22 of the member T; the area of the surfaces 25; the make and/or model of strain gauges utilized; the nature and/or characteristics of the electrical circuit with which the gauges are connected and other common and special features that are likely to be encountered.

The structure A next includes a case C carried by the plate B. The case C freely surrounds the member T and has or carries stop means S that oppose and that are engageable with those radially, outwardly and oppositely disposed sides of the upper portion 20 of the member T that occur at the second radial plane of the structure A.

In the case illustrated, the case C is a simple, elongate vertically extending tubular part 30 with a flat, horizontal lower end that is seated on the top surface 10 of the plate P and that is securely fastened to and/or with the plate by a plurality of circumferentially spaced fasteners 31, as clearly shown in the drawings. The upper end 32 of the part 30 occurs on a horizontal plane that can be substantially coincidental with the plane of the upper end of the upper portion 20 of the member T and from which the tool engaging head 23 on the member T projects.

The stop means S is shown as including an annular stop ring 40 slidably engaged into the upper end portion of the bore 33 defined by the part 30 and in close running clearance with and about the upper portion 20 of the member T. The stop ring 40 is releasably secured in working position in the part 30 by a plurality of circumferentially spaced set screws 41 engaged through the upper end portion of the part 30, as shown.

In practice, it is preferred that the part 30 be formed with an internal upwardly disposed stop shoulder to stop and properly orient the ring 40, axially within the structure A.

The upper end 42 of the ring 40 preferably occurs on a common plane with upper ends of the part 40 and portion 20 of the part T and the lower end 43 thereof preferably terminates above the lower end of the portion 20 of the member T, substantially as shown.

With the structure thus far described, it will be apparent that when the member T is subjected to lateral forces that pivot it about its pivotal axis and through the second radial plane of the structure, the upper end portion 20 of the member T engages and is stopped by the stop means S thereby limiting lateral movement of the member T so that the central portion 22 thereof is not bent or deflected laterally through the second radial plane and in such a manner as to adversely distort or deflect the working portion 22 of the member T and the gauges G and cause erroneous indications of those torsional forces sought to be determined.

In furtherance of the invention, the part 30 of the case C is formed with an opening 36 in one side thereof that is disposed radially outward from the portion 22 of the member T and in which a standard multi-pin coupler part 45 is engaged. The part 45 has a plurality of terminals at its inner end that are connected with related terminals of the gauges G by conductor lines in accordance with common practice. The outer end of the part 45 is accessible at the exterior of the part 40 and connects with a mating coupling part (not shown) at the free end of a conductor cable (not shown) that extends from the structure A to the electrical circuit (not shown) with which the structure is related and which includes the bridge in and with which the gauges G are connected.

In practice and as shown, it is desirable that the wall thickness of the part 30 be substantial so that it establishes stable engagement with the plate B; is not subject to being distorted or deflected laterally; and, so that the opening 36 therein is of sufficient axial extent to effectively threadably receive and accommodate the portion of the coupling part 45 that is engaged therein.

In another form and embodiment of the invention and as shown in FIG. 6 of the drawings, the stop means S' includes an anti-friction bearing 50 with inner and outer races and an intermediate series of ball-bearings. The bearing 50 is engaged in the bore in the part 30 and about the upper portion 20 of the member T in stopped engagement with the shoulder in the bore of the part 30 and below the ring 40. In this form of the invention, the ring 40 is not a stop ring, but rather is a retaining ring for the bearing 50. The inner and outer rings of the bearing 50 are slidably engaged with and about the portion 22 of the member T and within the bore 33 of the part 30.

In practice, it is preferred that the surfaces 25 of the portion 22 of the member T be flat. However, in certain instances and as shown in FIG. 7 of the drawings, it is desirable that the surfaces 25 be radiused in cross-section, about axes spaced radially outward from the member T; that is, that they be made concaved in cross-section. By so forming the surfaces 25, the working portion 22 of the member T can be made more flexible in response to torsional forces applied through the member while not reducing its thickness and web strength as much as when the surfaces 25 are flat (as shown in the first embodiment of the invention). When the surfaces 25 are concaved, as shown, the circumferential extent of the outer longitudinal edges of the working portion 22 of the member T is substantially greater in thickness than the central portion thereof. When the surfaces 25 are curved, as noted above, the web strength of the portion 22 (which resists lateral deflection through the first radial plane of the structure A, is effective through a greater circumferential extent of the structure and its reduction in strength that allows it to deflect or bend laterally through the second plane of the structure increases progressively towards and is greatest at the second radial plane of the structure. Thus, the resulting structure is better able to function, as intended, when subjected to forces directed laterally onto the upper end portion 20 of the member T, regardless of the direction from which those forces come, circumferentially of the structure.

Having described only typical preferred forms and embodiments of the invention, we do not wish to be limited to the specific details herein set forth but wish to reserve to ourselves any modifications and/or variations that might appear to those skilled in the art and which fall within the scope of the following claims.

Having described our invention, we claim:

1. A torque transducer comprising a horizontal base plate, an elongate vertically extending torsion member with elongate upper and lower end portions and an elongate axially extending central deflection portion, pivot means couple the lower end portion of the member in rotary driving engagement to the plate for pivotal movement of the member about a horizontal axis that is parallel with a first radial plane through the transducer and normal to a second radial plane through the transducer, a tool engaging head at and projecting up from the upper end of the member, the deflecting portion of the member is rectangular in cross-section with its major cross-sectional axis normally parallel with said first radial plane and having oppositely disposed strain gauge supporting surfaces in planes normally parallel with said first radial plane, strain gauges fixed to the mounting surfaces and connected with a related electrical circuit remote from the transducer, a case carried by the plate and surrounding the member, stop means on the case engageable with the upper end portion of the member and stopping lateral displacement and pivoting of the member through said second radial plane.

2. The torque transducer set forth in claim 1 wherein said pivot means includes an elongate horizontal pivot pin carried by the plate on an axis parallel with said first radial plane and engaged through a pivot pin opening in the lower end portion of the member.

3. The torque transducer set forth in claim 1 wherein the stop means is an annular part on the case normally in close running clearance with and about the upper portion of the member.

4. The transducer set forth in claim 1 wherein the stop part is an anti-friction bearing with an outer annular race carried by the case, and inner annual race carried by the member.

5. The torque transducer set forth in claim 1 wherein said pivot means includes an elongate horizontal pivot pin carried by the plate on an axis parallel with said first radial plane and engaged through a pivot pin opening in the lower end portion of the member, the stop part is an annular part on the case normally in close running clearance with and about the upper portion of the member.

* * * * *